United States Patent [19]
Ellis

[11] Patent Number: 4,700,745
[45] Date of Patent: Oct. 20, 1987

[54] VALVE
[75] Inventor: Darwin L. Ellis, Richmond, Ind.
[73] Assignee: Aluminum Company of America, Pittsburgh, Pa.
[21] Appl. No.: 792,500
[22] Filed: Oct. 29, 1985
[51] Int. Cl.⁴ ............................................. F16K 11/02
[52] U.S. Cl. ........................... 137/625.11; 137/625.15; 137/625.21
[58] Field of Search ...................... 137/625.11, 625.12, 137/625.15, 625.21, 625.23; 251/176, 180; 184/6.9, 35

[56] References Cited
U.S. PATENT DOCUMENTS

| | | | |
|---|---|---|---|
| 1,519,670 | 12/1924 | Danstrup | 137/625.21 |
| 2,079,041 | 5/1937 | Ryan et al. | 137/625.21 |
| 2,741,265 | 4/1956 | Poor | 137/625.11 |
| 2,918,938 | 12/1959 | Kimball | 137/625.11 |
| 3,198,004 | 8/1965 | Roberts et al. | 137/625.15 |
| 3,255,568 | 6/1966 | Martin et al. | 53/95 |
| 3,658,092 | 4/1972 | Walker et al. | 137/625.21 |
| 3,851,669 | 12/1974 | Zellbeck et al. | 137/625.21 |
| 4,047,473 | 9/1977 | Fletcher et al. | 93/36 B |
| 4,256,134 | 3/1981 | Redetzky | 137/118 |
| 4,279,273 | 7/1981 | Acre | 137/627.5 |
| 4,328,831 | 5/1982 | Wolff | 137/625.31 |
| 4,353,288 | 10/1982 | Holub | 91/375 A |
| 4,440,351 | 4/1984 | Novotny | 241/41 |
| 4,442,755 | 4/1984 | Rozycki | 91/39 |
| 4,452,201 | 6/1984 | Mazur et al. | 123/339 |
| 4,501,297 | 2/1985 | Baker | 137/625.46 |

Primary Examiner—Alan Cohan
Assistant Examiner—John A. Rivell
Attorney, Agent, or Firm—Thomas J. Connelly

[57] ABSTRACT

A valve is disclosed for distributing pressurized fluid, such as air, from a single supply source to a plurality of rotatable screwcapping heads. The valve includes a stationary member axially aligned with a rotatable shaft which has a first surface with first and second arcs formed therein, both of the arcs having an equal radius. The stationary member also has an inlet passage connecting the supply source to the first arc and an outlet passage connecting the second arc to the atmosphere. The valve further includes a support member which is securely fixed to the rotatable shaft and a rotational member which is axially aligned with the rotatable shaft and rotatably fixed to the support member. The rotational member has a first surface which is positioned adjacent to the first surface of the stationary member and has at least two slots formed therein which are arranged on a predetermined radius equal to the radius of the first and second arcs. The rotational member also includes a plurality of radial passages connecting each of the slots to one of the screwcapping heads. Compression springs are positioned between the support member and the rotational member for urging the rotational member into constant contact with the stationary member and to prevent the leakage of pressurized fluid therebetween.

9 Claims, 6 Drawing Figures

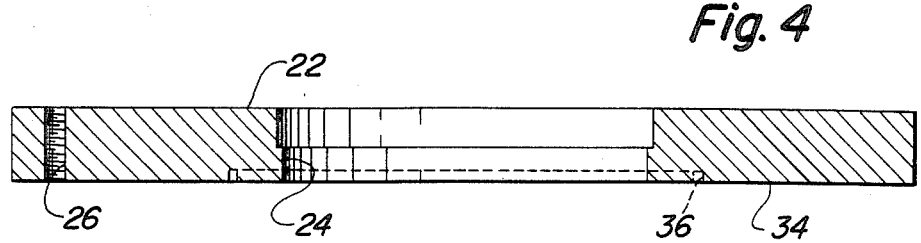
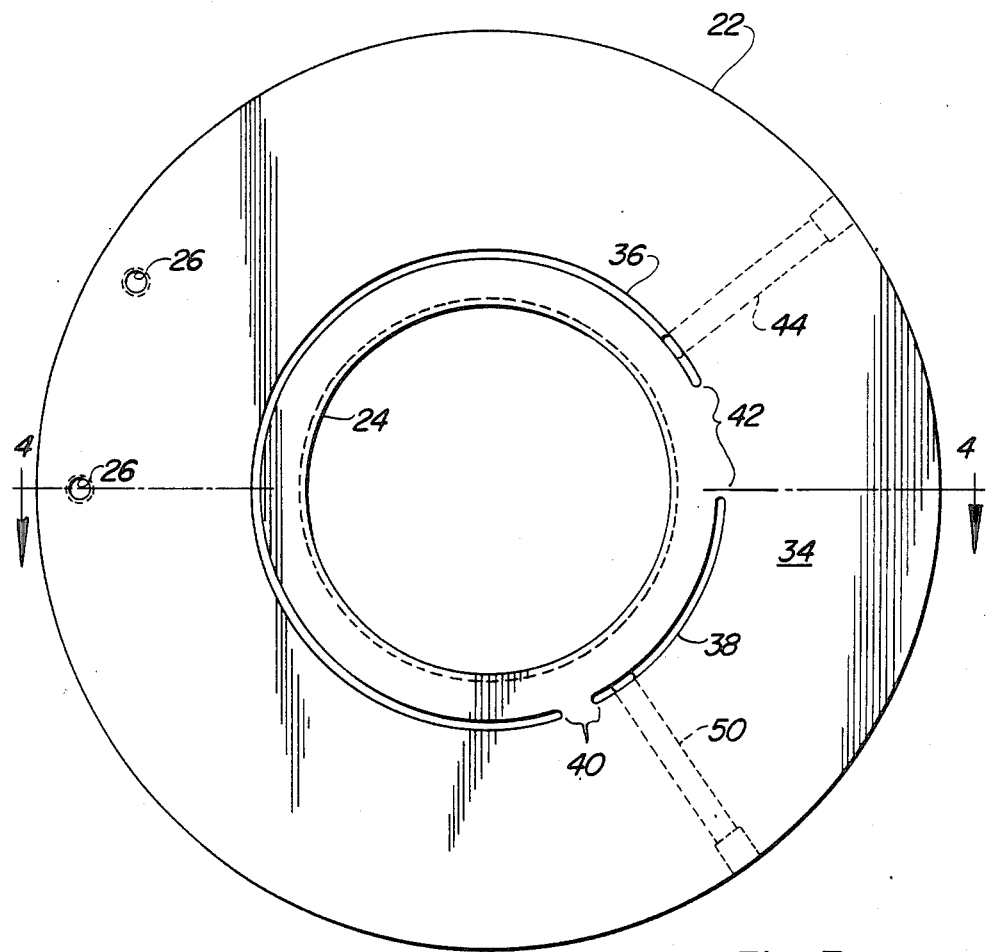

VALVE

FIELD OF THE INVENTION

This invention relates to a valve for distributing pressurized air from a stationary supply source to a plurality of rotatable screwcapping heads.

BACKGROUND OF THE INVENTION

Various types of valves are known for distributing a fluid medium such as air, liquid or gas from a single supply source to a plurality of fluid operated functions. Two such valves are taught in U.S. Pat. Nos. 4,256,134 and 4,328,831. Such valves work satisfactorily, but most do not provide a means for exhausting or venting the pressurized fluid from the fluid operated function back through the valve and then out to the atmosphere.

Now a valve has been invented which is capable of doing this.

SUMMARY OF THE INVENTION

Briefly, the present invention relates to a valve for distributing pressurized fluid from a stationary supply source to a plurality of rotatable screwcapping heads. The screwcapping heads are arranged radially about a rotatable shaft and are capable of moving axially as well as rotationally. The valve includes a stationary member axially aligned with the rotatable shaft which has a first surface with first and second arcs formed therein. Both of the arcs have an equal radius. The stationary member also has an inlet passage which connects a pressurized supply source to the first arc and an outlet passage which connects the second arc to the atmosphere. The valve further includes a support member securely fixed to the rotatable shaft and a rotatable member axially aligned with the rotatable shaft and rotatably secured to the support member. The rotatable member has a first surface positioned adjacent to the first surface of the stationary member. This first surface has at least two slots formed therein which are arranged on a predetermined radius equal to the radius of the first and second arcs. The rotational member also has at least two radial passages formed therein which connect each of the slots to one of the screwcapping heads. The rotatable member is biased into constant contact with the stationary member by springs located between the support member and the rotational member. The springs assure that pressurized fluid from the supply source can be routed through the first arc and at least one of the slots to at least one of the screwcapping heads. Simultaneously, fluid from at least one of the screwcapping heads is vented through at least one of the slots and the second arc to the atmosphere.

A general object of this invention is to provide a valve for distributing pressurized fluid. A more specific object of this invention is to provide a valve for distributing pressurized air from a stationary supply source to a plurality of rotatable screwcapping heads.

Another object of this invention is to provide an air valve for distributing pressurized air from a single supply source to a plurality of radially aligned and rotatable screwcapping heads.

Still further, an object of this invention is to provide a valve of simple construction for dividing a single inlet flow into a plurality of equal outlet flows.

A further object of this invention is to provide an inexpensive and easy to assemble air distribution valve.

Other objects and advantages of the present invention will become apparent to those skilled in the art in view of the following description and the accompanying drawings.

BRIEF DESCRIPTION OF THE DRAWINGS

FIG. 3 is a bottom view of the stationary member of the valve.

FIG. 4 is a cross-sectional view taken along the line 4—4 of FIG. 3.

DETAILED DESCRIPTION OF THE PREFERRED EMBODIMENT

Figure 1:
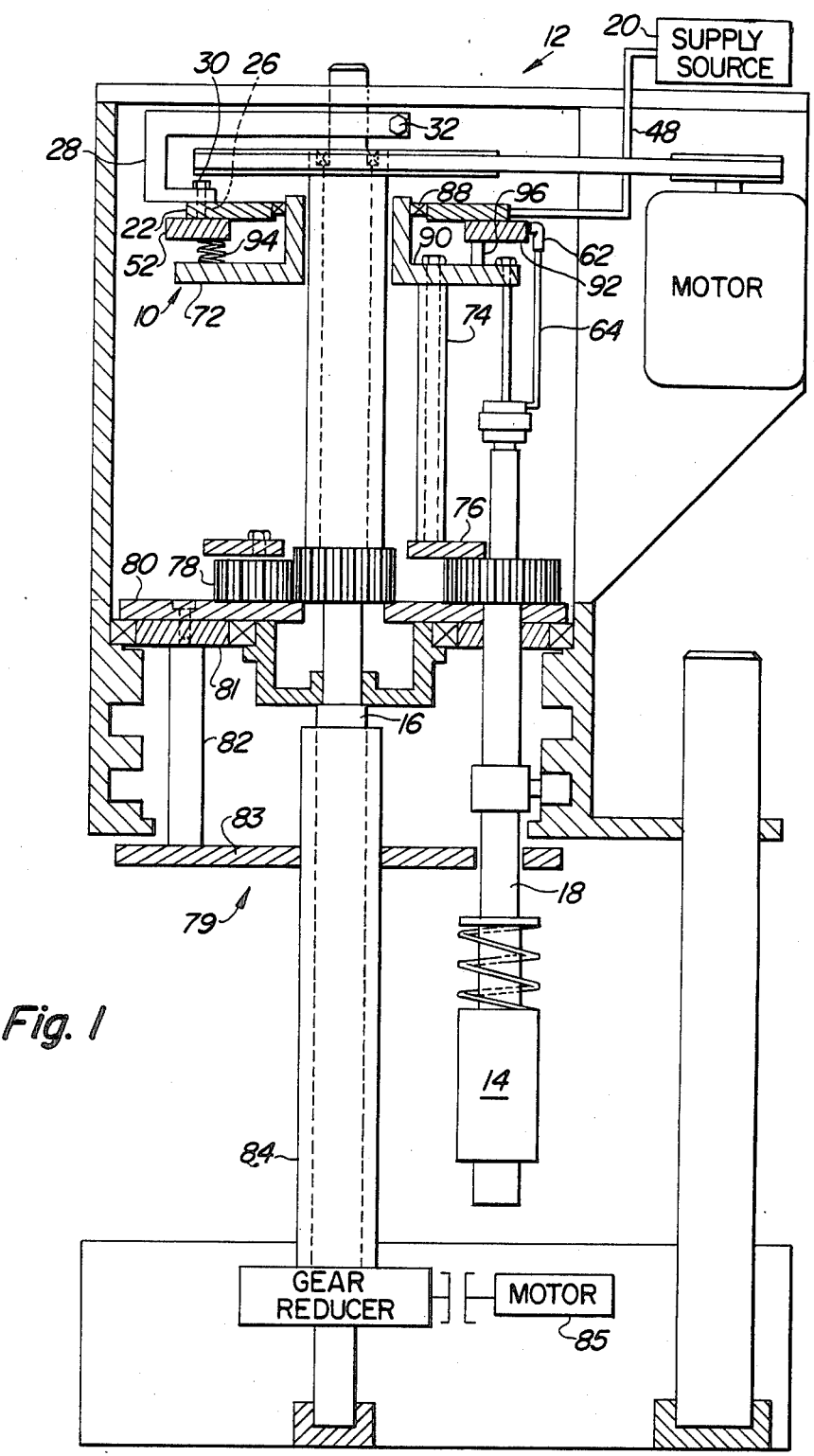
FIG. 1 is a schematic view of the valve arranged in a screwcapping machine for supplying pressurized fluid from a single stationary supply source to a plurality of rotatable screwcapping heads.
Figure 2:
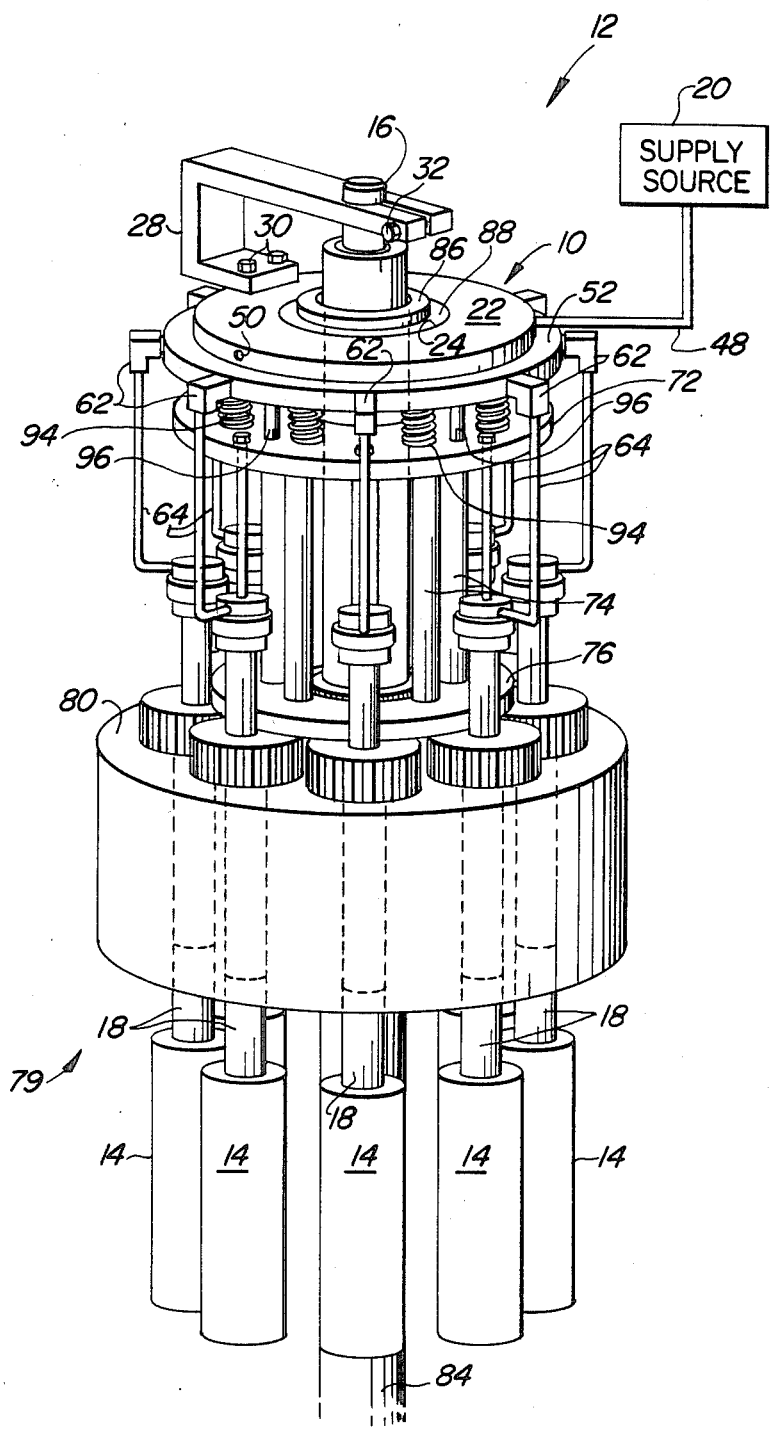
FIG. 2 is a perspective view of the valve and screwcapping heads shown in FIG. 1.

Referring to FIGS. 1 and 2, a valve 10 is shown in use in a screwcapping machine 12 having a plurality of screwcapping heads 14. In such machines, it is common for six, eight or ten screwcapping heads 14 to be mounted in a circular fashion around a stationary support shaft 16. The screwcapping heads 14 are designed to reciprocate up and down as well as to rotate about their own axis on spindles 18. A typical screwcapping machine 12 utilizes a single supply source 20 to supply equal amounts of pressurized fluid, preferably pressurized air at 50 to 100 psi, to each of the screwcapping heads 14.

Referring to FIGS. 2, 3 and 4, the valve 10 includes a stationary member 22 which is disc shaped in configuration and has an enlarged axial through bore 24. The stationary member 22 also contains a pair of threaded bores 26 located adjacent to its outer periphery which enable a brace 28 to be bolted thereto by a pair of bolts 30. The brace 28 in turn is securely fastened to the support shaft 16 by a bolt 32. The stationary member 22 contains a flat first surface 34 which has first and second arcs 36 and 38, respectively, formed therein. The length, depth and width of the first and second arcs 36 and 38 can be varied to suit one's particular flow distribution. However, it is advantageous to separate the first arc 36 from the second arc 38 by first and second flat portions 40 and 42, respectively. The length of the flat portions 40 and 42 should be of sufficient length, preferably 10° or more, so as to prevent fluid leakage therebetween. This is especially important when pressurized air is circulated through the valve 10.

The length of the first and second arcs 36 and 38 will depend upon the application for which the valve 10 is being used. For application in the screwcapping machine 12, it is preferred that the first arc 36 be at least twice as long as the second arc 38, and more preferably that the first arc 36 be at least 250° while the second arc 38 be at least 60°.

The stationary member 22 also contains an inlet passage 44 which is radially formed therein and fluidly connects the first arc 36 to a conduit 48 which is connected to the supply source 20. An outlet passage 50 is also radially formed within the stationary member 22 and fluidly connects the second arc 38 to the atmosphere. It should be noted that when a pressurized liquid, such as hydraulic oil, is being distributed through the valve 10, it is advantageous to connect the outlet passage 50 to a reservoir so that the fluid can be recovered and reused.

Figure 6:
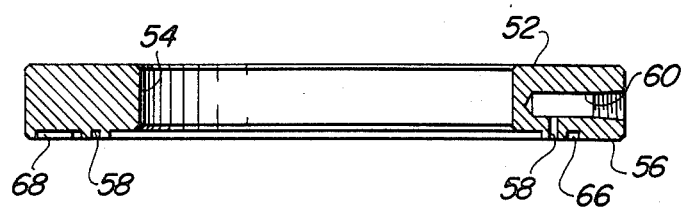
FIG. 6 is a cross-sectional view taken along the line 6—6 of FIG. 5.
Figure 5:
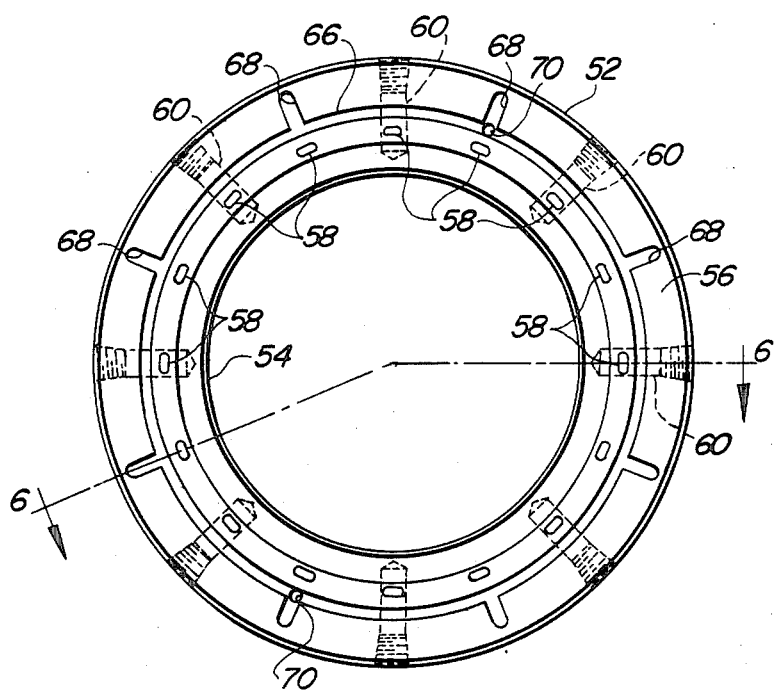
FIG. 5 is a top view of the rotatable member of the valve.

Referring to FIGS. 5 and 6, the valve 10 also contains a rotational member 52 which is coaxially aligned with the support shaft 16. The rotational member 52 contains an axially aligned through bore 54 and has a first flat surface 56 which is positioned adjacent to the first surface 34 of the stationary member 22. The first surface 56 has at least two and preferably a plurality of slots 58 formed therein which are arranged in a circular fashion on a predetermined radius. The predetermined radius is equal to the radius of the first and second arcs 36 and 38. The number of slots 58 will at least correspond to the number of screwcapping heads 14; for example, when eight screwcapping heads 14 are used, there will be at least eight slots 58 positioned 45° apart. Additional slots 58 can be present which can be initially filled with grease to assist in reducing the friction between the stationary member 22 and the rotational member 52. The slots 58 are preferably arranged an equal distance apart on the first surface 56. As shown in FIG. 5, half of the slots 58 are connected to a radial passage 60 which terminates at the outer periphery of the rotational member 52. The radial passages 60 are fluidly connected by a threaded elbow 62 and a conduit 64 to a respective screwcapping head 14, see FIG. 2. The first surface 56 of the rotational member 52 also contains a circular groove 66 formed therein which serves as a lubrication reservoir. The groove 66 is 360° in arc length and has a radius greater than the radius on which the slots 58 are arranged. The depth of the circular groove 66 is shallower than that of the slots 58 and therefore does not intersect with the radial passages 60. When additional lubrication is needed, a plurality of outwardly extending radial grooves 68 are formed on the first surface 56 which intersect with the groove 66. The size, depth and number of the grooves 68 will depend on the type and amount of lubrication needed and upon the application of the valve 10. Preferably, the grooves 68 will be equally spaced around the circumference of the groove 66.

The rotational member 52 also contains a pair of vent holes 70 preferably spaced 180° apart and arranged on a radius equal to that of the circular groove 66. The vent holes 70 are machined through the width of the rotational member 52 and serve to vent fluid or air which has leaked into the circular groove 66 from the slots 58.

Referring again to FIGS. 1 and 2, the valve 10 further includes a support member 72 which is connected by one or more vertical posts 74 (only one of which is shown) to a support bracket 76. The support bracket 76 in turn is connected to the central shaft of an idler gear 78 which is rotatably fixed to a turret assembly 79. The turret assembly 79 includes upper plates 80 and 81, vertical supports 82 (only one of which is shown) and a bottom plate 83. The turret assembly 79 is secured to a rotatable sleeve 84 which surrounds a lower portion of the support shaft 16 and is rotated by motor 85. The turret assembly 79 assures that the support member 72 will rotate about the upper portion of the support shaft 16 at an equivalent speed.

The support member 72 has an upstanding hub 86 which provides a seat for a bearing 88. The bearing 88 is located between the hub 86 and the stationary member 22 and prevents axial misalignment therebetween. Located between a top surface 90 of the support member 72 and a bottom surface 92 of the rotational member 52 are a plurality of equally spaced compression springs 94 and alignment pins 96. The springs 94 and the pins 96 assure that the first surface 56 of the rotational member 52 remains in constant contact with the first surface 34 of the stationary member 22. This in turn assures that pressurized air from the supply source 20 will be routed through the inlet passage 44 through the first arc 36 and into one or more of the slots 58 and through the respective radial passages 60 to the screwcapping heads 14. Simultaneously, pressurized air from one or more of the screwcapping heads 14 will be vented through at least one of the radial passages 60 and the respective slot 58 via the second arc 38 and the outlet passage 50 to the atmosphere. By adjusting the length of the arcs 36 and 38 to the desired rotation of the screwcapping heads 14, one can adjust the torque at which the screwcapping head 14 will tighten a screw closure onto a prethreaded container.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

I claim:

1. A valve for distributing pressurized fluid from a stationary supply source to a plurality of rotatable screwcapping heads, said screwcapping heads being arranged radially about a rotatable shaft, said valve comprising:
   (a) a stationary member axially aligned with said rotatable shaft and having a first surface with first and second arcs formed therein, both arcs having an equal radius, an inlet passage connecting said supply source to said first arc and an outlet passage connecting said second arc to the atmosphere;
   (b) a support member securely fixed to said rotatable shaft;
   (c) a rotational member axially aligned with said rotatable shaft and being rotatably secured to said support member, said rotational member having a first surface in contact with said first surface of said stationary member, said first surface having at least two slots formed therein which are arranged on a predetermined radius, said predetermined radius being equal to the radius of said first and second arcs, and at least two radial passages fluidly connecting each of said slots to one of said screwcapping heads; and
   (d) biasing means for urging said rotatable member into constant contact with said stationary member, said biasing means located between said support member and said rotational member for assuring that pressurized fluid from said supply source can be routed through said first arc and at least one of said slots to at least one of said screwcapping heads and exhaust fluid from at least one of said screwcapping heads can be vented through at least one of said slots and said second arc to the atmosphere.

2. The valve of claim 1 wherein said biasing means are compression springs.

3. The valve of claim 1 wherein said first surface of said rotatable member has a circular groove formed therein which serves as a lubrication reservoir, said groove having a radius greater than the radius on which said slots are arranged.

4. The valve of claim 3 wherein said circular groove has an arc length of 360° and has a plurality of outwardly extending radial grooves connected thereto which increase the lubricating area between said rotatable member and said stationary member.

5. The valve of claim 3 wherein said circular groove is connected to a second surface of said rotatable member by at least one vent passage.

6. The valve of claim 1, wherein said first arc is at least twice as long as said second arc.

7. The valve of claim 1 wherein said first arc has an arc length of at leat 250°.

8. The valve of claim 1 wherein said second arc has an arc length of at least 60°.

9. A valve assembly for distributing pressurized air from a stationary supply source to a plurality of rotatable screwcapping heads, said valve assembly comprising:
  (a) a stationary central shaft about which said screwcapping heads are radially aligned;
  (b) a housing rotatably mounted on said central shaft and driven by a motor;
  (c) a stationary member axially aligned with said rotatable housing and having a first surface with first and second arcs formed therein, both arcs having an equal radius, an inlet passage connecting said supply source to said first arc and an outlet passage connecting said second arc to the atmosphere;
  (d) a support member securely fixed to said rotatable housing;
  (e) a rotational member axially aligned with said rotatable housing and being rotatably secured to said support member, said rotational member having a first surface in contact with said first surface of said stationary member, said first surface having a plurality of slots formed therein which are arranged on a predetermined radius, said predetermined radius being equal to the radius of said first and second arcs, and a plurality of radial passages connecting each of said slots to one of said screwcapping heads; and
  (f) biasing means for urging said rotatable member into constant contact with said stationary member, said biasing means being located between said support member and said rotatable member for assuring that pressurized air from said supply source can be routed through said first arc and at least one of said slots to at least one of said screwcapping heads and exhaust air from at least one of said screwcapping heads can be vented through at least one of said slots and said second arc to the atmosphere.

* * * * *